(12) United States Patent
Haringer

(10) Patent No.: US 7,086,490 B2
(45) Date of Patent: Aug. 8, 2006

(54) TRACKED VEHICLE

(75) Inventor: Alois Johann Haringer, Neumarkt (IT)

(73) Assignee: macmoter S.p.A., Modigliana (IT)

( * ) Notice: Subject to any disclaimer, the term of this patent is extended or adjusted under 35 U.S.C. 154(b) by 0 days.

(21) Appl. No.: 10/434,293

(22) Filed: May 7, 2003

(65) Prior Publication Data

US 2003/0226697 A1 Dec. 11, 2003

(30) Foreign Application Priority Data

| May 17, 2002 | (DE) | ............................. 102 22 602 |
| Jun. 3, 2002 | (DE) | ............................. 102 24 658 |

(51) Int. Cl.
 *B62D 55/00* (2006.01)
(52) U.S. Cl. .................... 180/9.1; 180/6.48; 180/6.44; 180/6.7
(58) Field of Classification Search ................. 180/9.1, 180/6.48, 6.44, 6.7
See application file for complete search history.

(56) References Cited

U.S. PATENT DOCUMENTS

| 2,878,883 | A |   | 3/1959  | France et al. |            |
|-----------|---|---|---------|---------------|------------|
| 3,645,349 | A | * | 2/1972  | Nichter       | 180/6.48   |
| 3,792,745 | A |   | 2/1974  | Files         |            |
| 3,872,939 | A | * | 3/1975  | Eckert        | 180/6.48   |
| 4,000,784 | A | * | 1/1977  | Morrow et al. | 180/9.48   |
| 4,069,884 | A | * | 1/1978  | Morrow et al. | 180/9.1    |
| 4,207,969 | A | * | 6/1980  | Howell        | 188/71.6   |
| 4,418,775 | A | * | 12/1983 | Leroux        | 180/9.62   |
| 4,579,182 | A |   | 4/1986  | Dewing et al. |            |
| 4,739,852 | A | * | 4/1988  | Stevens et al.| 180/9.62   |
| 4,823,852 | A | * | 4/1989  | Langford      | 144/4.1    |
| 4,942,934 | A | * | 7/1990  | Moriarty      | 180/6.48   |
| 4,986,377 | A | * | 1/1991  | Moriarty      | 180/6.5    |
| 6,047,785 | A | * | 4/2000  | Snyder et al. | 180/9.1    |
| 2002/0005303 | A1 |   | 1/2002 | Haringer      |            |

* cited by examiner

*Primary Examiner*—Lesley D. Morris
*Assistant Examiner*—Marlon Arce-Diaz
(74) *Attorney, Agent, or Firm*—W. F. Fasse; W. G. Fasse

(57) ABSTRACT

A tracked vehicle has smooth driving and idler wheels (6, 7, 8, 9), which frictionally transmit the tractive force to tracks (3, 4), e.g. rubber tracks, and which are mounted on a frame (3) of the vehicle which carries at least one driving engine (11). To avoid the slipping of the tracks on the driving and idler wheels, both the two front idler wheels (6, 7) and the two rear idler wheels (8, 9) are respectively driven. The front wheels are hydraulically driven, while the rear wheels may be hydraulically or mechanically driven.

19 Claims, 7 Drawing Sheets

TRACKED VEHICLE

FIELD OF THE INVENTION

The invention relates to a tracked vehicle having smooth driving and idler wheels which frictionally transmit the tractive force to tracks, in particular to rubber tracks, and which are mounted by means of a frame which carries at least one driving engine.

BACKGROUND INFORMATION

Tracked vehicles of the said type with rubber tracks are known in principle and have on the one hand various advantages, which are offset on the other hand by the disadvantage that the tracks on the smooth idler and driving wheels may slip during damp weather. This effect is intensified in particular when contaminants which act like a lubricant are added to the moisture.

SUMMARY OF THE INVENTION

The object of the invention is therefore to provide measures, by means of which slipping of the tracks on the smooth idler and driving wheels can be minimized or prevented.

To achieve this object, the invention provides for the two front idler wheels and the two rear idler wheels to be driven in each case and thus to serve as driving wheels at the same time. The fact that the drive is assigned to each idler wheel and thus each idler wheel is at the same time configured as a driving wheel results in the slipping effect of the rubber tracks on the driving wheels being minimized. The tension normally present, with which the tracks are held on the idler and driving wheels, is sufficient in a four-wheel drive in order to ensure satisfactory functioning of the tracks even in a moist or contaminated state.

In effect, the drive is thus a four-wheel drive with a preferably mechanical power transmission to the rear idler wheels, possibly having a larger diameter, and with a hydraulic power or energy transmission to the front idler wheels, possibly having a smaller diameter.

In principle, however, in a development of the invention, in each case a hydraulic motor may also be assigned to each of the four idler wheels, it also being possible for reduction units/reduction gear units to preferably be assigned to the front driving and idler wheels if the rear driving and idler wheels have a larger diameter than the front driving and idler wheels.

Further features of the invention emerge from subclaims and from the description in connection with the drawing.

BRIEF DESCRIPTION OF THE DRAWINGS

The invention is described in more detail below with reference to exemplary embodiments which are shown in the drawing, in which.

DETAILED DESCRIPTION OF PREFERRED EXAMPLE EMBODIMENTS AND OF TEE BEST MODE OF THE INVENTION

Figure 1:
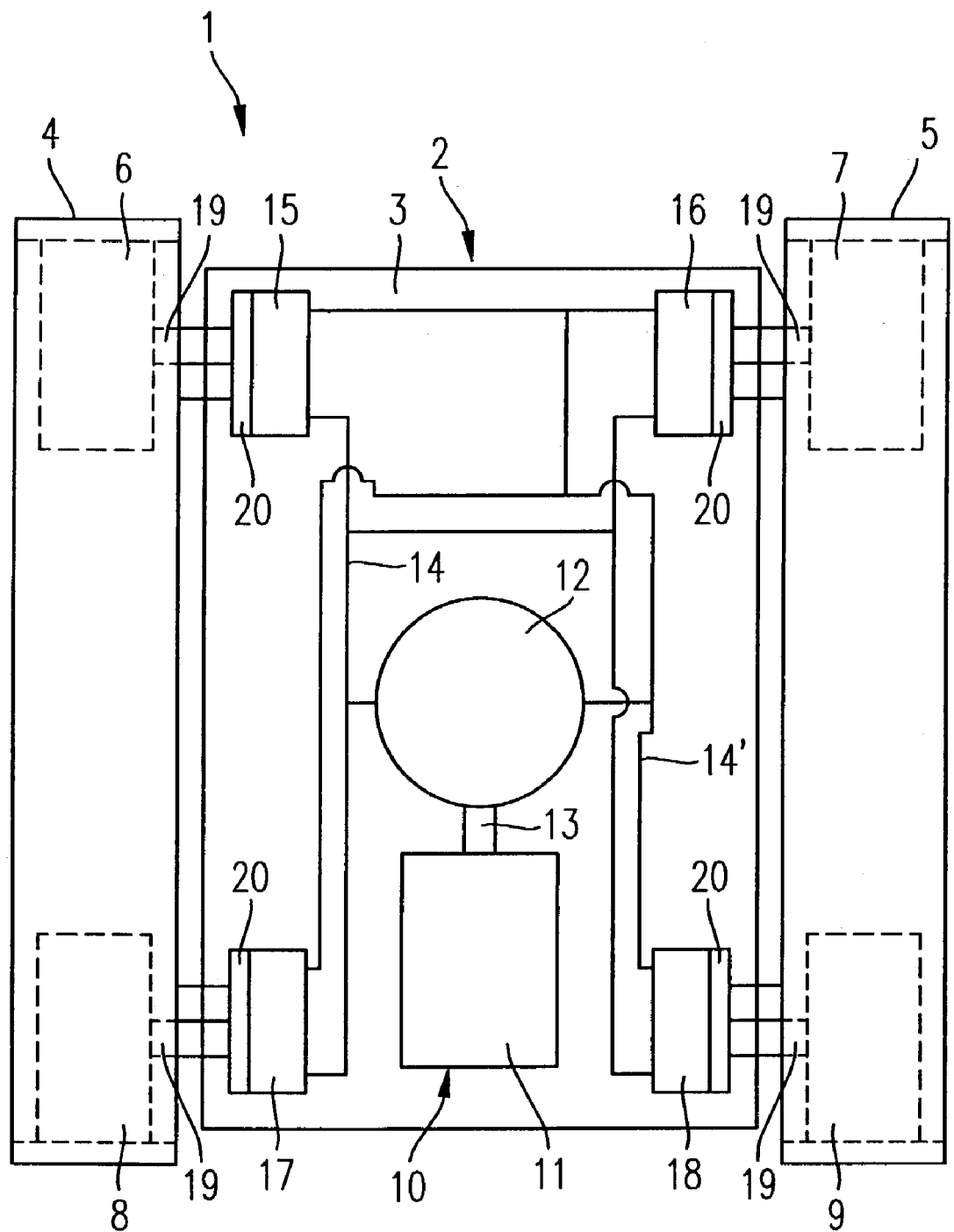
FIG. 1: shows a diagrammatic sketch of the drive for all four driving and idler wheels of a tracked vehicle.

A tracked vehicle 1, of which in FIG. 1 only parts of the undercarriage 2 with a frame 3 are shown in principle, comprises two tracks 4 and 5 with associated rear and front driving and idler wheels 6 and 7 and respectively 8 and 9. The tracks 3 and 4 are preferably rubber tracks. In principle, however, they may also be made of another material. The important factor is that they are arranged on smooth outer drive surfaces of the driving and idler wheels 6 to 9 which frictionally transmit the tractive force, and that they correspondingly have smooth inner contact surfaces (see FIGS. 1 to 4).

The drive 10 of the tracked vehicle 1 comprises a driving engine 11, which is likewise arranged on the frame 3. The driving engine 11 is expediently an internal combustion engine. A pump 12 is connected to the driving engine 11 via a shaft 13 and produces hydraulic energy which serves for the energy supply of drive units 15 and 16 and respectively 17 and 18. On the one hand, the hydraulic lines 14 lead from the pump 12 to all the drive units 15 to 18, and further hydraulic lines 14' in turn lead from the drive units 15 to 18 back to the pump 12.

Valves and control devices likewise required in principle are known and are not shown in FIG. 1 for the sake of clarity.

The four drive units 15 to 18 are hydraulic motors, which convert the supplied hydraulic energy into energy of rotation and deliver it to the driving and idler wheels 6 to 9 by means of a shaft 19.

Furthermore, if necessary, a reduction unit 20/reduction gear unit is assigned to each drive unit 15 to 18, as can likewise be seen schematically from FIG. 1

Figure 2:
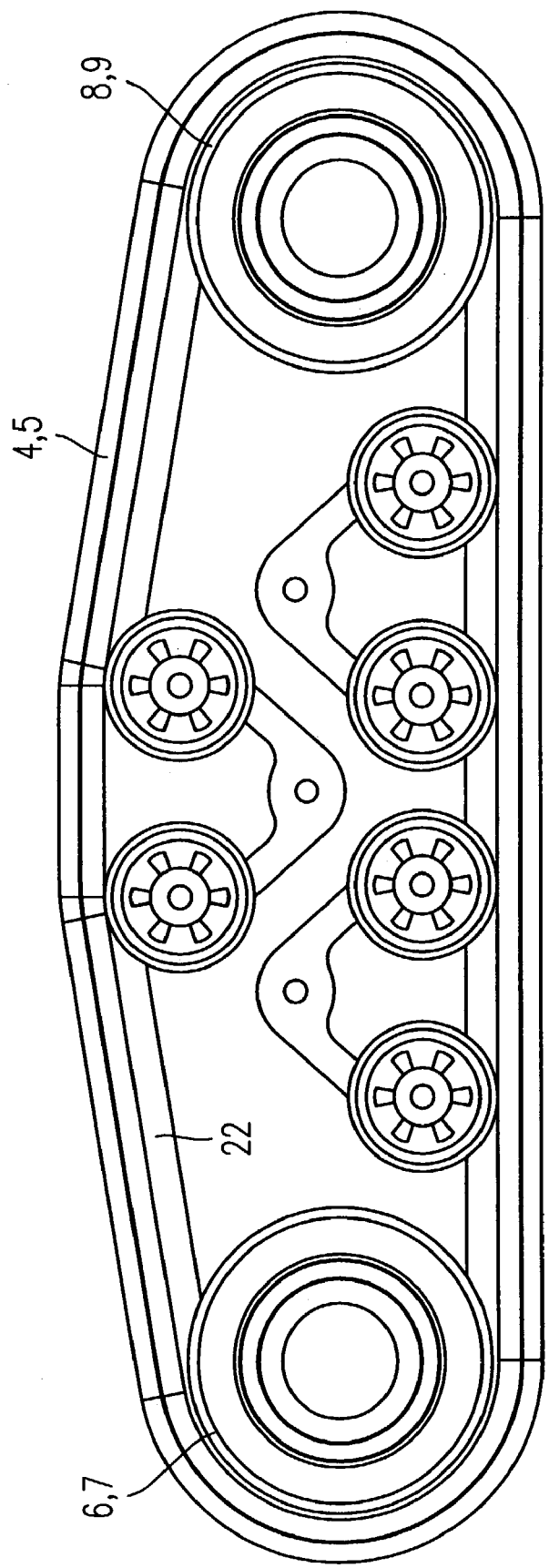
FIG. 2: shows a diagrammatic sketch of a side view of the travel gear of a track with front and rear driving and idler wheels of the same size.
Figure 3:
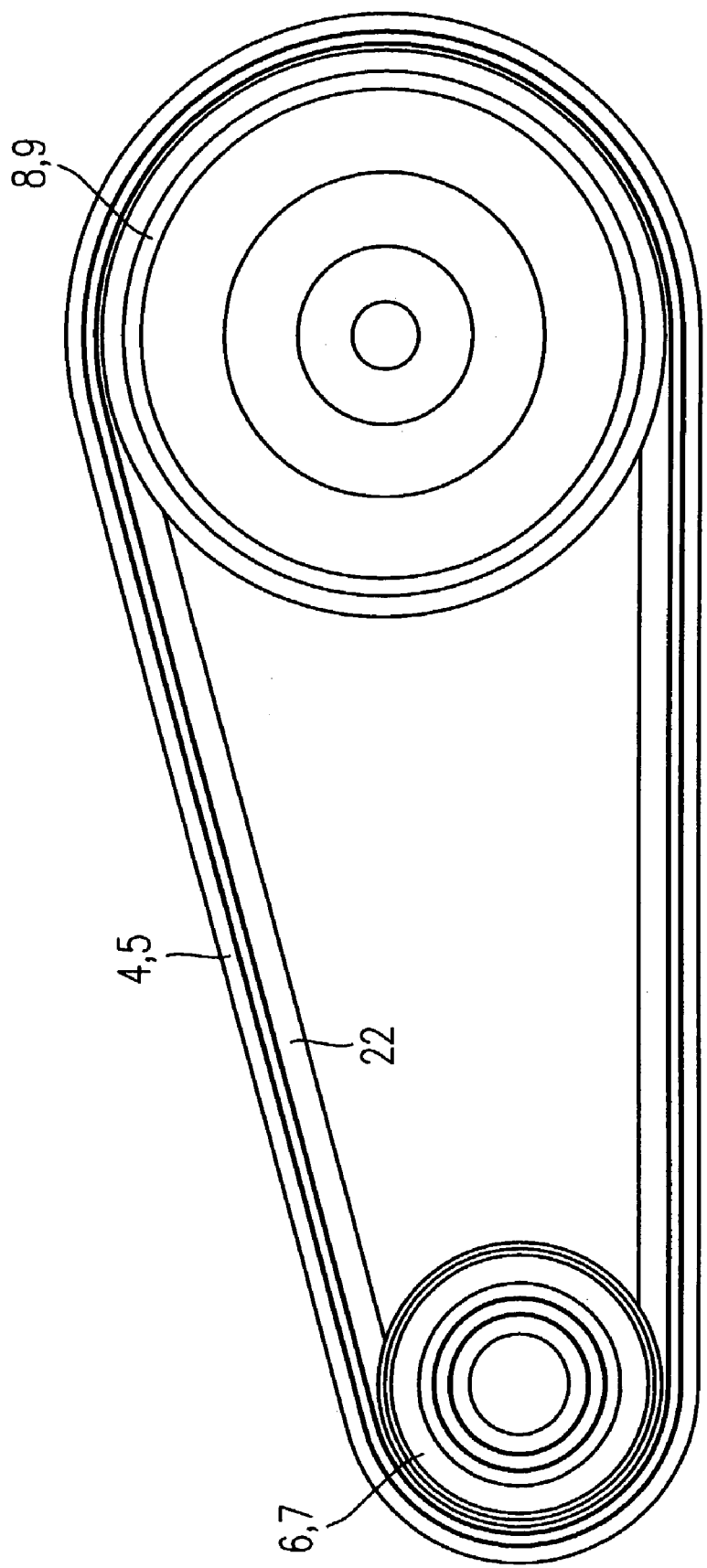
FIG. 3: shows a view similar to that of FIG. 2 with driving and idler wheels of different sizes at the front and rear, respectively.

In the exemplary embodiment shown in FIG. 2, the front driving and idler wheels 6 and 7, respectively, and the rear driving and idler wheels 8 and 9, respectively, are in each case the same size. However, an identical size or an identical diameter is not absolutely necessary. Thus, the front driving and idler wheels 6 and 7, respectively, may be markedly smaller than the rear driving and idler wheels 8 and 9, respectively, as the diagrammatic sketch according to FIG. 3 shows.

In principle, reduction units 20 are not necessary at each of the drive units 15 to 18 in all cases. Such reduction units are as a rule only necessary when the driving and idler wheels at the front and rear, respectively, are of different sizes.

Figure 6:
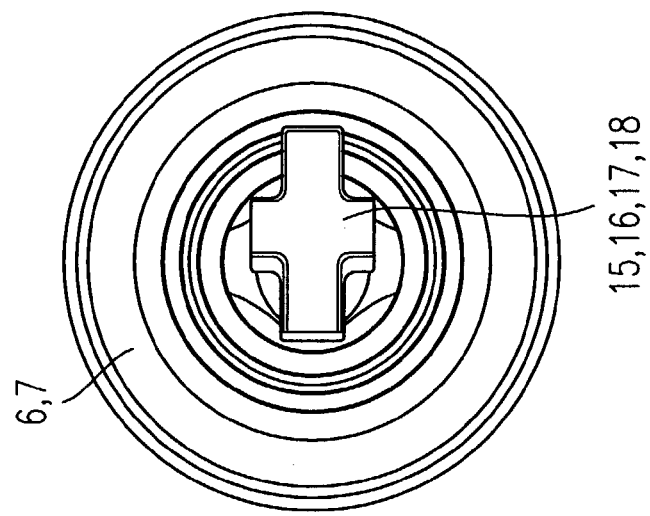
FIG. 6: shows a side or end view of the driving and idler wheel according to FIG. 4 from its second side.
Figure 5:
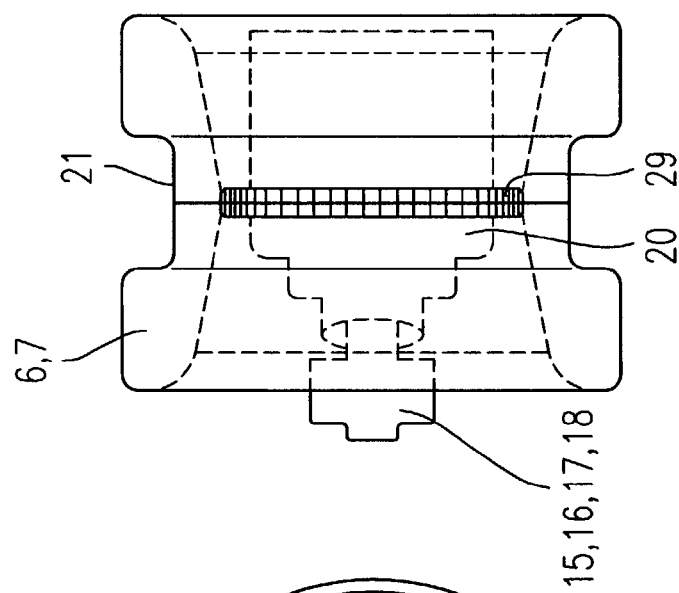
FIG. 5: shows a view of the driving and idler wheel according to FIG. 4 looking toward its circumference.
Figure 4:
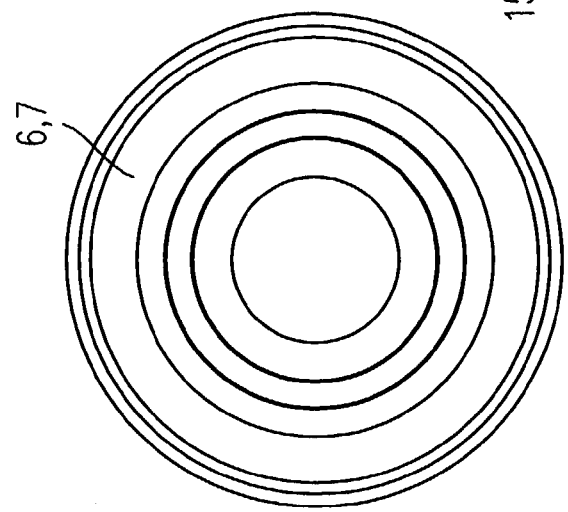
FIG. 4. shows a side view of a driving and idler wheel on a larger scale.

Furthermore, FIGS. 4 to 6 show a driving and idler wheel in three views from the front and rear and from the side, respectively. In this case, a centrally arranged channel 21 or a circumferential groove for reliably guiding the track 4 or 5 can clearly be seen according to FIG. 5. The channelshaped recess 21 serves to accommodate a longitudinal rib 22 (see FIG. 3) on the inner surface of the tracks 4, 5 which is assigned to the driving and idler wheels 6 to 9.

Figure 7:
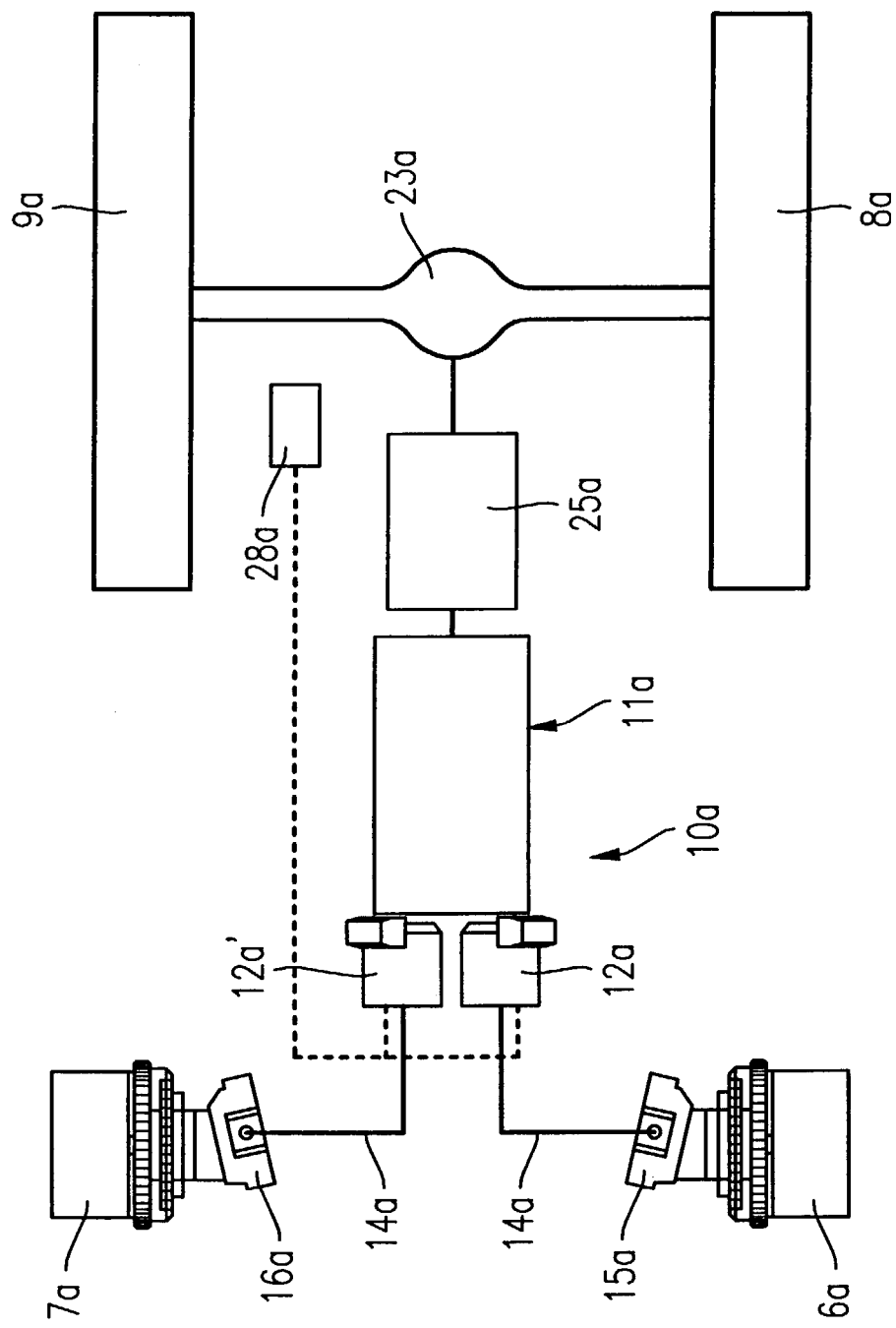
FIG. 7: schematically shows a plan view of the drive and the driving and idler wheels of a modified exemplary embodiment without tracks, the rear driving and idler wheels having a larger diameter than the front ones.
Figure 8:
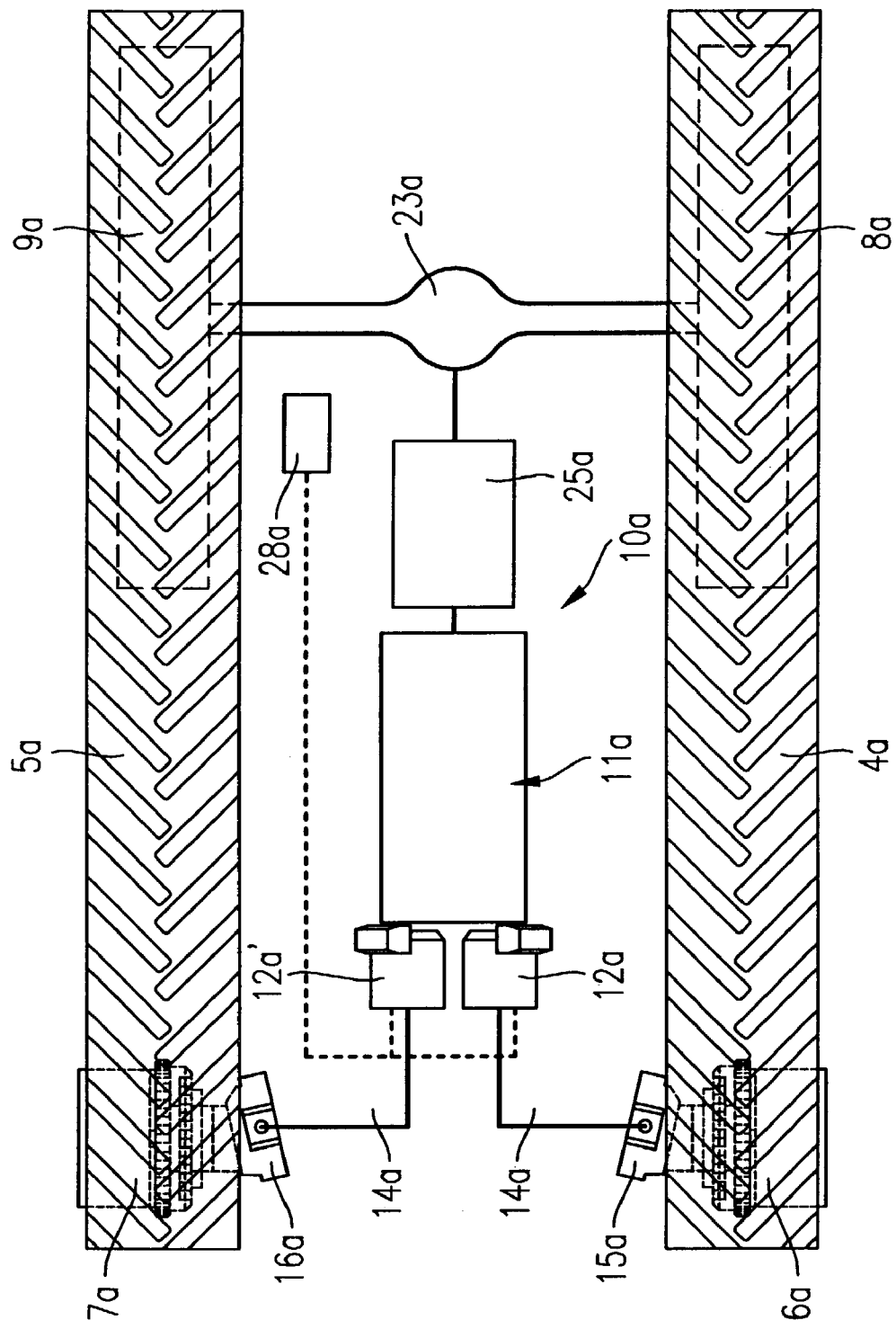
FIG. 8: shows a view as in FIG. 7 with tracks.

The two FIGS. 7 and 8 schematically show an exemplary embodiment having a drive 10a which likewise comprises a driving engine 11a in the form of an internal combustion engine. In principle, the same parts as in the exemplary embodiment described first have the seine reference numerals and in addition the letter index or suffix a.

In the exemplary embodiment shown in FIGS. 7 and 8, the driving engine 11a transmits the drive energy in a solely mechanical manner to the two rear driving and idler wheels 8a and 9a and the two tracks 4a and 5a. To this end, conventional components such as a gear unit, differential, etc., are provided as drive elements and form drive units (differential 23a).

Furthermore, the driving engine 11a drives at least one pump and, according to the exemplary embodiment, two pumps 12a und 12a' for producing hydraulic energy.

Via hydraulic lines 14a, which are only shown schematically and not completely in FIGS. 7 and 8, the hydraulic energy of the pumps 12a and 12a' transmitted to drive units 15a and 16a which are assigned to the two front driving and idler wheels 6a and 7a. These drive units 15a and 16a are hydraulic motors.

Furthermore, the two hydraulic motors include reduction units or reduction gear units, since the two front driving and idler wheels 6a and 7a have a smaller diameter than the rear driving and idler wheels 8a and 9a.

These reduction gear units are directly integrated in the hydraulic motors and are therefore not separately shown in FIGS. 7 and 8.

Finally, the invention is not restricted to the exemplary embodiments shown in the figures. On the contrary, modifications are possible without deviating from the inventive idea. Thus, the invention is not restricted to mechanical and/or hydraulic drives. Instead of a hydraulic drive, an electric drive is equally suitable for realizing the invention. However, a drive by means of only an internal combustion engine without including hydraulic components also enables the invention to be realized. Although these variants are neither explained in more detail in the description nor shown in the figures, they are possible in principle and for this reason are covered by the inventive idea.

Finally, the invention is suitable for use not only in construction vehicles but in particular also in agricultural vehicles (tractors). In particular, there is also the fact that not only can new tracked vehicles be equipped with the four-wheel drive, but vehicles already in use can be additionally or subsequently supplemented with the drive units according to the invention at the front idler wheels.

In particular, the pump 12 or the pumps 12a, 12a', in combination with the associated hydraulic lines 14a and the necessary valves and control devices and also with the hydraulic motors, serving as drive units 15a and 16a, including gear units at the front driving and idler wheels 6a and 7a, may be made available as parts of a retrofit unit for tracked vehicles already in use of the type of interest here.

Finally, it is significant that the hydraulic drive for the front driving and idler wheels does not have to be constantly active. It is sufficient if the drive for the front idler wheels can be engaged when required and thus selectively or can be dispensed with at times. The engagement is effected electrically or electronically. To this end, a special control device or special components for the control device are provided.

The special engagement of the drive units for the front driving and idler wheels has greater importance in particular at low travel speeds. As a rule, the engagement is of no importance at high travel speeds.

The activation of the drives for the front driving and idler wheels is therefore also preferably controlled electrically or electronically only at low speeds of the driving and idler wheels and possibly when there are different track speeds due to slipping.

In the case of the exemplary embodiment shown in FIG. 1, the drive units 15 to 18 are hydraulic motors, as are also the drive units 15a and 16a in the case of the exemplary embodiment illustrated in FIGS. 7 and 8. Since the rear driving and idler wheels 8a and 9a (FIGS. 7 and 8) have a mechanical power transmission incorporating a differential 23, brakes (not shown in the figures) are preferably provided for these wheels. This applies in particular, when, for example, it is desired to convert a tractor to the tracked vehicle.

Furthermore, a transmission 25a and joystick or steering wheel 28a are provided and shown diagrammatically in FIGS. 7 and 8, as also applies to a ring gear 29 shown in FIG. 5.

Figure 9:
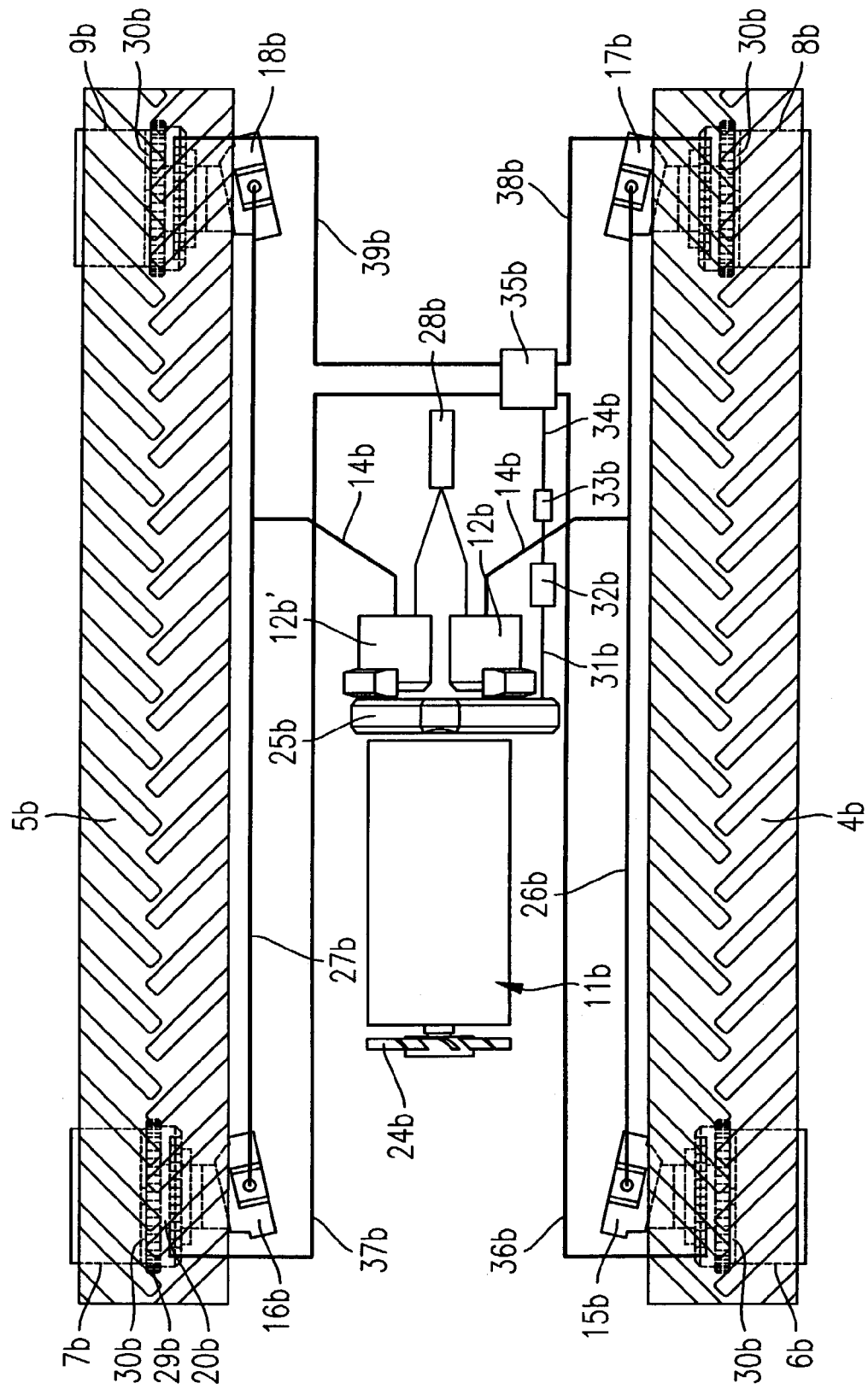
FIG. 9: is similar to FIG. 8 and shows another exemplary embodiment, in which the front and rear driving and idler wheels are of the same size and each is driven by a hydraulic motor, and it also shows brake lines.

The tracked vehicle according to FIG. 9 has two tracks 4b and 5b which run round driving and idler wheels 6b and 7b or 8b and 9b respectively. The drive motor 11b is provided with a fan 24b and drives two pumps 12b and 12b' via a transmission 25b. A hydraulic line 14b connects the pump 12b' to the left-hand distributing line 26b, which is connected to the left-hand drive units 15b and 17b (hydraulic motors). Similarly, a hydraulic line 14b connects the pump 12b' to a right-hand distributing line 27b, which is connected to the right-hand drive units 16b and 18b (hydraulic motors). To the pumps 12b and 12b' there is assigned a joystick or steering wheel 28b to make it possible to apply more power to one of the two pumps 12b and 12b' than to the other so as to drive the left-hand and right-hand drive units at different speeds when necessary (cornering).

Each of the drive units 15b to 18b is in driving engagement with the driving and idling wheels 6b to 9b, respectively, via a gear reduction unit 20b and a ring gear 29b. To each of the driving and idling wheels 6b to 9b there is assigned a multiple-disk brake 30b, which can be actuated hydraulically. For this purpose a hydraulic pump 32b is connected to the transmission 25b via a pump shaft 31b. The hydraulic pump 32b, to which a storage vessel 33b for hydraulic fluid is assigned, is connected, via a main brake line 34b, to brake-selecting means 35b, from which the hydraulic brake lines 36b, 37b, 38b and 39b lead to the individual multiple-disk brakes 30b. Left-hand or right-hand deceleration of the driving and idler wheels 6b and 8b or 7b and 9b, respectively, supports the afore-mentioned steering action achieved by means of the joystick or steering wheel 28b.

FIGS. 1, 7 and 8 do not show any braking means, but similar braking means to those described in connection with FIG. 9 may be provided.

The invention claimed is:

1. A tracked crawler vehicle comprising:
a vehicle frame;
at least one driving engine mounted on said vehicle frame;
left and right crawler tracks respectively having smooth inner contact surfaces;
plural drive and idler wheels including left and right front wheels and left and right rear wheels that are each respectively rotatably supported relative to said vehicle frame and are each respectively rotationally drivable by said at least one driving engine, wherein said left crawler track is carried and driven on said left front and rear wheels, said right crawler track is carried and driven on said right front and rear wheels, and said front and rear wheels have smooth drive surfaces which respectively contact said smooth inner contact surfaces and thereby are adapted to frictionally transmit a tractive force to a respective one of said crawler tracks carried and driven thereon;

hydraulically actuatable multi-disk brakes respectively provided for each of said front and rear wheels; and a drive arrangement interposed and connected for drive power transmission between said at least one driving engine and said front and rear wheels so as to drive said front and rear wheels while avoiding slippage between said front and rear wheels and said crawler tracks, wherein said drive arrangement comprises first left and right hydraulically operating drive units respectively connected to said left and right front wheels.

2. The tracked crawler vehicle according to claim 1, wherein said crawler tracks are rubber tracks.

3. The tracked crawler vehicle according to claim 1, wherein said drive arrangement further comprises second left and right hydraulically operating drive units respectively for said left and right rear wheels.

4. The tracked crawler vehicle according to claim 3, wherein said at least one engine comprises at least one internal combustion engine, and said drive arrangement further comprises at least one hydraulic pump connected to and adapted to be driven by said at least one internal combustion engine and hydraulically connected and adapted to provide hydraulic power to said first and second left and right hydraulically operating drive units.

5. The tracked crawler vehicle according to claim 4, wherein each one of said hydraulically operating drive units respectively comprises a respective hydraulic motor.

6. The tracked crawler vehicle according to claim 5, wherein said drive arrangement for said front wheels further comprises left and right reduction transmissions respectively interposed between said hydraulic motors and said left and right front wheels.

7. The tracked crawler vehicle according to claim 1, wherein said rear wheels respectively have a larger diameter than said front wheels, and wherein said drive arrangement for said front wheels further comprises left and right reduction transmissions respectively interposed between said first left and right hydraulically operating drive units and said left and right front wheels.

8. The tracked crawler vehicle according to claim 7, wherein said first left and right hydraulically operating drive units respectively comprise respective hydraulic motors that are components of a retrofit kit installed in said tracked crawler vehicle.

9. The tracked crawler vehicle according to claim 1, wherein said drive arrangement further comprises a mechanical drive that is mechanically connected and adapted to mechanically transmit drive power to said left and right rear wheels, and wherein said hydraulically operating drive units respectively comprise respective hydraulic motors for said left and right front wheels.

10. The tracked crawler vehicle according to claim 9, wherein said mechanical drive comprises a mechanical differential between said left and right rear wheels.

11. A combination of an agricultural tractor and a retrofit kit retrofitted onto said tractor that has a vehicle frame, and at least lone driving engine mounted on said vehicle frame, wherein said retrofit kit or said tractor includes left and right rear wheels connected to said at least one engine for drive power transmission from said at least one engine to said rear wheels, and wherein said retrofit kit includes:
left and right front wheels rotatably supported relative to said vehicle frame;
left and right crawler tracks respectively carried and driven on said left front and rear wheels and said right front and rear wheels;
at least one hydraulic pump connected to and adapted to be driven by said at least one driving engine;
left and right hydraulically operating drive units respectively comprising left and right hydraulic motors connected to and adapted to drive said left and right front wheels; and
hydraulic lines connecting said hydraulic motors to said at least one hydraulic pump.

12. The combination according to claim 11, wherein said tractor includes a mechanical drive connected between said at least one driving engine and said rear wheels.

13. A tracked crawler vehicle comprising:
a vehicle frame;
at least one driving engine mounted on said vehicle frame;
left and right crawler tracks respectively having smooth inner contact surfaces;
plural drive and idler wheels including left and right front wheels and left and right rear wheels that are each respectively rotatably supported relative to said vehicle frame and are each respectively rotationally drivable by said at least one driving engine, wherein said left crawler track is carried and driven on said left front and rear wheels, said right crawler track is carried and driven on said right front and rear wheels, and said front and rear wheels have smooth drive surfaces which respectively contact said smooth inner contact surfaces and thereby are adapted to frictionally transmit a tractive force to a respective one of said crawler tracks carried and driven thereon; and a drive arrangement interposed and connected for drive power transmission between said at least one driving engine and said front and rear wheels, wherein said drive arrangement comprises first left and right hydraulically operating drive units respectively connected to said left and right front wheels as well as second left and right hydraulically operating drive units respectively connected to said left and right rear wheels.

14. The tracked crawler vehicle according to claim 13, wherein said at least one engine comprises at least one internal combustion engine, and said drive arrangement further comprises at least one hydraulic pump connected to and adapted to be driven by said at least one internal combustion engine and hydraulically connected and adapted to provide hydraulic power to said first and second left and right hydraulically operating drive units.

15. The tracked crawler vehicle according to claim 14, wherein each one of said hydraulically operating drive units respectively comprises a respective hydraulic motor.

16. The tracked crawler vehicle according to claim 15, wherein said drive arrangement for said front wheels further comprises left and right reduction transmissions respectively interposed between said hydraulic motors and said left and right front wheels.

17. The tracked crawler vehicle according to claim 13, wherein each one of said crawler tracks respectively has a lengthwise stabilizing rib that protrudes inwardly from and runs longitudinally along said smooth inner contact surface thereof, and wherein each one of said front and rear wheels respectively has a circumferential groove that is recessed into and extends circumferentially around said smooth drive surface thereof and that receives therein said stabilizing rib of a respective one of said crawler tracks.

18. The combination according to claim 11, wherein each one of said crawler tracks respectively has a smooth inner contact surface and a lengthwise stabilizing rib that protrudes inwardly from and runs longitudinally along said smooth inner contact surface thereof, and wherein each one of said front and rear wheels respectively has a smooth drive surface and a circumferential groove that is recessed into and extends circumferentially around said smooth drive surface thereof and that receives therein said stabilizing rib of a respective one of said crawler tracks.

19. The tracked crawler vehicle according to claim 1, wherein each one of said crawler tracks respectively has a lengthwise stabilizing rib that protrudes inwardly from and runs longitudinally along said smooth inner contact surface thereof, and wherein each one of said front and rear wheels respectively has a circumferential groove that is recessed into and extends circumferentially around said smooth drive surface thereof and that receives therein said stabilizing rib of a respective one of said crawler tracks.

* * * * *

UNITED STATES PATENT AND TRADEMARK OFFICE
CERTIFICATE OF CORRECTION

PATENT NO. : 7,086,490 B2
APPLICATION NO. : 10/434293
DATED : August 8, 2006
INVENTOR(S) : Haringer It is certified that error appears in the above-identified patent and that said Letters Patent is hereby corrected as shown below:

Column 3,
Line 8, after "the", replace "seine" by --same--;
Line 22, after "12a' ", insert --is--;

Column 5,
Line 65, after "least", replace "lone" by --one--.

Signed and Sealed this

Twenty-seventh Day of February, 2007

JON W. DUDAS
*Director of the United States Patent and Trademark Office*